UNITED STATES PATENT OFFICE

ARTHUR ZITSCHER, OF OFFENBACH-ON-THE-MAIN, GERMANY, ASSIGNOR TO GENERAL ANILINE WORKS, INC., OF NEW YORK, N. Y., A CORPORATION OF DELAWARE

AZO DYESTUFFS INSOLUBLE IN WATER AND FIBER DYED THEREWITH

No Drawing. Application filed August 26, 1931, Serial No. 559,597, and in Germany August 29, 1930.

My present invention relates to new azo dyestuffs insoluble in water and fiber dyed therewith.

These dyestuffs correspond to the general formula:

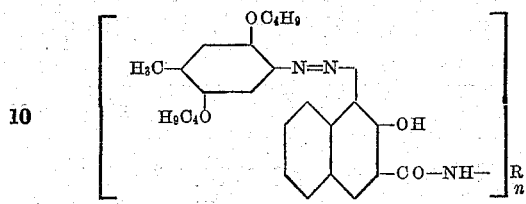

wherein R means a radical of the benzene, naphthalene, anthracene, acenaphthene, carbazole or quinoline series which radical may contain halogen, nitro-, alkoxy-, alkyl-, dialkylamino-sulfonyl- [(alkyl)$_2$N-SO$_2$-], alkyl- sulfonyl- or phenylamino-carbonyl- (C$_6$H$_5$NHCO) groups and wherein $n$ means the number 1 or 2.

They are obtained by combining the diazo compound of 1-amino-4-methyl-2.5-di-n-butyloxy-benzene with a (2-hydroxy-naphthalene-3-carbonyl) amino-aryl, wherein aryl means the radical signified in the above formula by R.

They may be produced in substance and used for making color lakes or they may be prepared on fibers. As fibers suitable for the production of these dyestuffs thereon may be named: animal fibers (for example, silk) native cellulose (for example, cotton), regenerated cellulose (for example, viscose).

The dyeings thus obtained show reddish violet to blue shades and are distinguished by a good fastness, especially to peroxide-bleaching. The latter operation consists in treating at a temperature rising from 40° C. to about 80° C. for ¾ hour 1 part of dyed material with 10 parts of a solution containing per liter 2 grs. of sodium peroxide and 6 grs. of water-glass.

By the present invention the possibility of producing violet and blue dyeings by means of the ice color method is enlarged since among the diazo compounds of the benzene series only those containing a further nitrogeneous group were hitherto know to turn the shade sufficiently to the blue end of the spectrum.

In order to further illustrate my invention, the following examples are given. I wish it, however, to be understood that I am not limited to the particular products or reaction conditions mentioned therein.

Example 1

Well boiled and dried cotton yarn is impregnated with a solution containing per liter 6 grs. of 1-(2-hydroxy-napthalene-3-carbonyl)-amino-3-ethoxy-benzene, 12 cc. of caustic soda solution of 34° Bé. and 10 cc. of Turkey red oil. Then the goods are well wrung out and developed in a solution which contains per liter the diazo compound of 2.6 grs. of 1-amino-4-methyl-2.5-di-n-butyl-oxy-benzene and which is neutralized partially with sodium bicarbonate and then with sodium acetate until the acid reaction towards Congo has disappeared. After rinsing and soaping a reddish violet dyeing of a very good fastness to chlorine and to peroxide is obtained. The dyestuff thus produced on the fiber corresponds to the formula:

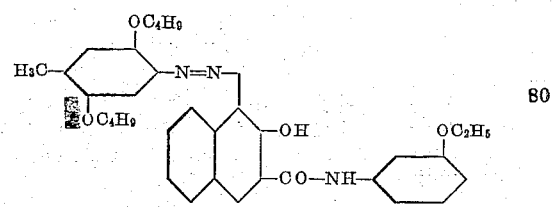

1-(2-hydroxy-naphthalene-3-carbonyl)-amino-3-methoxy-benzene yields with the same diazo compound a dark bluish violet dyeing.

Example 2

Cotton yarn previously treated in an appropriate manner is impregnated with a solution containing per liter 4 grs. of 1-(2-hydroxy-naphthalene-3-carbonyl)-amino-3-chloro-benzene, 8 cc. of caustic soda solution of 34° Bé. and 10 cc. of Turkey red oil. Then the goods are well dehydrated and developed as described in Example 1. In this manner a blue dyeing of a very good fastness to chlorine and to peroxide is obtained. The dyestuff thus produced on the fiber corresponds to the formula:

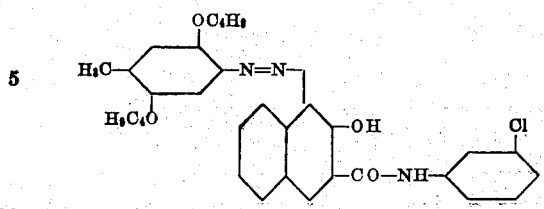

1-(2-hydroxy-naphthalene - 3 - carbonyl) - amino-2-chloro-benzene yields with the same diazo compound a reddish violet dyeing.

*Example 3*

A hank of silk is impregnated with a solution containing per liter 5 grs. of 1-(2-hydroxy - naphthalene - 3 - carbonyl)-amino-3-methyl-benzene, 7.5 cc. of caustic soda solution of 34° Bé., 10 cc. of Turkey red oil and one of the usual silk-protecting agents as, for example, sulfite-cellulose waste liquor, the temperature being maintained at about 25° C. After 15 minutes, 10 grs. of common salt are added and the goods are again handled for ¼ of an hour and well dehydrated.

Thereafter they are developed in a bath which contains per liter the diazo compound of 2.6 grs. of 1-amino-4-methyl-2.5-di-n-butyl-oxy-benzene, 5 cc. of an acetic acid of 50% strength and 10 grs. of common salt, the mineral acid having been neutralized with sodium acetate. After soaping, rinsing and drying a reddish violet dyeing is obtained. The dyestuff thus produced on the fiber corresponds to the formula:

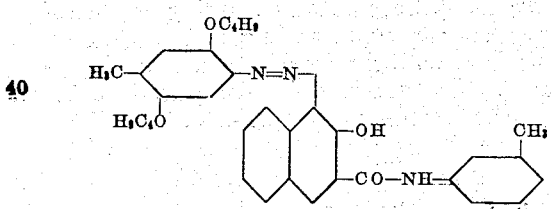

1 - 2 - hydroxy - naphthalene-3-carbonyl)-amino-4-methoxy-benzene yields on wool with the same diazo compound a reddish violet dyeing.

*Example 4*

Viscose is impregnated for ½ an hour with a gradual addition of 10 grs. of common salt in a bath containing per liter 1.5 grs. of 1 - (2 - hydroxy - naphthalene-3-carbonyl) - amino-2-methyl-4-chloro-benzene, 3 cc. of caustic soda solution of 34° Bé. and 10 cc. of Turkey red oil. Then the goods are well centrifuged and developed in a solution which contains the diazo compound of 2.6 grs. of 1-amino-4-methyl-2.5-di-n-butyl-oxy-benzene per liter, the excess of mineral acid having been neutralized with sodium acetate. After rinsing and soaping a dark blue dyeing is obtained. The dyestuff thus produced on the fiber corresponds to the formula:

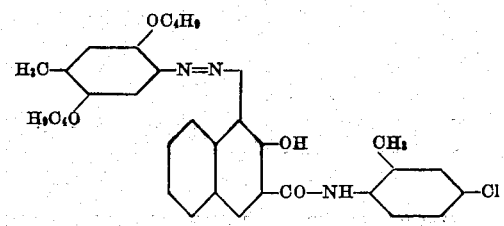

A similar, somewhat more reddish dyeing is produced by means of 1-(2-hydroxy-naphthalene-3-carbonyl)-amino-2-methyl-benzene and the same diazo compound.

The dyestuffs may also be produced according to one of the customary printing processes.

The following table shows the shades of some other dyestuffs of this kind: the diazo compound of 1-amino-4-methyl-2.5-di-n-butyl-oxy-benzene yields with the (2-hydroxy-naphthalene-3-carbonyl) — compound of

|  | Shade |
|---|---|
| amino-benzene | Reddish violet. |
| 1-amino-3-nitro-benzene | Do. |
| 1-amino-naphthalene | Do. |
| 2-amino-naphthalene | Dark violet. |
| 1-amino-2-ethoxy-benzene | Reddish violet. |
| 1-amino-4-methyl-benzene | Do. |
| 1-amino-2-methoxy-benzene | Do. |
| 1-amino-4-chloro-benzene | Do. |
| 1-amino-3.4-dichloro-benzene | Violet. |
| 1-amino-2-methoxy-5-chloro-benzene | Reddish violet. |
| 1-amino-2-methoxy-4-chloro-benzene | Do. |
| 1-amino-2.5-dimethoxy-benzene | Do. |
| 1-amino-2.5-dimethoxy-4-chloro-benzene | Do. |
| 1-amino-3-methyl-4-methoxy-benzene | Do. |
| 1-amino-2-ethyl-5-chloro-benzene | Violet. |
| 2-amino-3-methoxy-naphthalene | Reddish violet. |
| 1-amino-3-(phenyl-amino-carbonyl)-benzene | Do. |
| 1-amino-3-(dimethyl-amino-sulfonyl)-benzene | Violet. |
| 1-amino-2-methyl-5-(ethyl-sulfonyl)-benzene | Do. |
| 2-amino-anthracene | Reddish violet. |
| 4-amino-acenaphthene | Dark reddish violet. |
| 2-amino-carbazole | Reddish violet. |
| 6-amino-2-methyl-quinoline | Dark violet. |
| 1.4-diamino-2.5-dimethyl-benzene (half molecular proportion). | Do. |
| 1.5-diamino-naphthalene (half molecular proportion). | Do. |

I claim:

1. As new compounds the azo dyestuffs of the general formula:

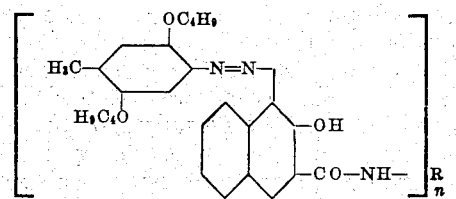

wherein R means a radical of the benzene, naphthalene, anthracene, acenaphthene, carbazole or quinoline series which radical may contain halogen, nitro-, alkoxy-, alkyl-, dialkylamino - sulfonyl - [(alkyl)$_2$N - SO$_2$-], alkylsulfonyl- or phenylaminocarbonyl- (C$_6$H$_5$NHCO) groups, and $n$ means the number 1 or 2 which compounds are insoluble in water and yield when produced on fibers reddish violet to blue dyeings of a good fastness.

2. As new compounds the azo dyestuffs of the general formula:

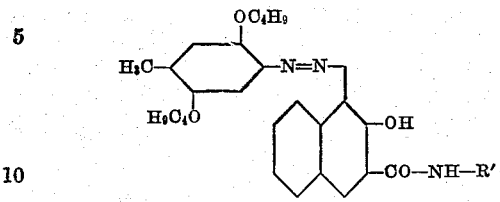

wherein R' means a radical of the benzene series which may contain halogen, nitro-, alkoxy-, alkyl-, dialkylamino-sulfonyl- [(alkyl)$_2$N-SO$_2$-], alkylsulfonyl- or phenylamino-carbonyl- (C$_6$H$_5$NHCO) groups, which compounds are insoluble in water and yield when produced on fibers reddish violet to blue dyeings of a good fastness.

3. As a new compound the azo dyestuff of the formula:

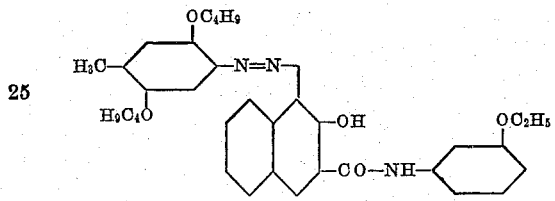

which compound is insoluble in water and yields when produced on fibers reddish violet dyeings of a good fastness.

4. As a new compound the azo dyestuff of the formula:

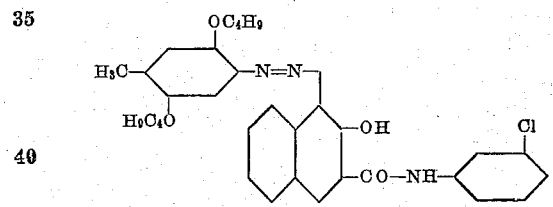

which compound is insoluble in water and yields when produced on fibers blue dyeings of a good fastness.

5. Fiber dyed with the azo dyestuffs as claimed in claim 1.

6. Fiber dyed with the azo dyestuffs as claimed in claim 2.

7. Fiber dyed with the azo dyestuff as claimed in claim 3.

8. Fiber dyed with the azo dyestuff as claimed in claim 4.

In testimony whereof, I affix my signature.

ARTHUR ZITSCHER.